United States Patent [19]

Shigematsu

[11] 4,177,756

[45] Dec. 11, 1979

[54] SURFACE COATING DEVICE OF BAMBOOS

[76] Inventor: Syozo Shigematsu, 9-9,4-chome, Habikigaoka, Habikino, Osaka-fu, Japan

[21] Appl. No.: 814,913

[22] Filed: Jul. 12, 1977

[30] Foreign Application Priority Data

Aug. 3, 1976 [JP] Japan ............................ 51-103590[U]

[51] Int. Cl.² .............................................. B05C 3/10
[52] U.S. Cl. ...................... 118/404; 118/416
[58] Field of Search ............... 118/404, 416, 419, 125, 118/232, 322, DIG. 11, DIG. 18, 405; 427/434 R, 434 C, 434 E; 425/97

[56] References Cited

U.S. PATENT DOCUMENTS

| | | | |
|---|---|---|---|
| 1,668,265 | 5/1968 | Christopher | 118/DIG. 11 |
| 1,681,566 | 8/1928 | Anderegg | 118/DIG. 18 |
| 2,560,778 | 7/1951 | Richardson et al. | 118/404 X |
| 2,766,479 | 10/1956 | Henning | 118/125 |
| 3,206,802 | 9/1965 | Van Riper | 118/125 |
| 3,515,577 | 6/1970 | Irwin | 118/419 X |
| 3,635,620 | 1/1972 | Brown | 118/405 |

*Primary Examiner*—Mervin Stein
*Attorney, Agent, or Firm*—Larson, Taylor and Hinds

[57] ABSTRACT

This invention relates to a surface coating device of bamboos including the stays having anti-corrosion, insect-prevention property and produced by said device characterizing that a nozzle having an opening permitting to freely pass natural materials such as bamboos or tree branches whose outside diameter is irregular is inserted in the resin chamber set up adjacent to the cylinder pushing out melted synthetic resin such as vinyl chloride and by passing said natural materials or the materials whose surface has been evenly coated beforehand by chemicals having adhesiveness like tar as well as anti-corrosion, insect-prevention property at a constant speed slowly rotating from backward of said nozzle, said melted resin successively fed in to said chamber adhesively coats the surface of said materials in a state of film.

2 Claims, 5 Drawing Figures

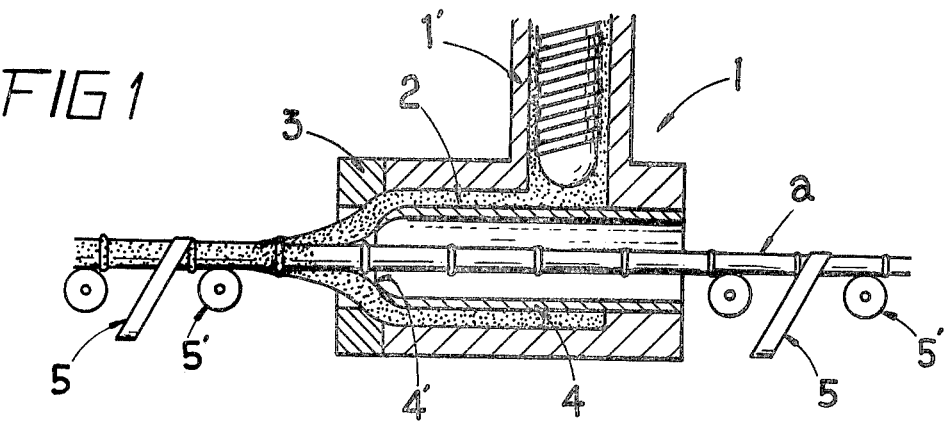
FIG 1
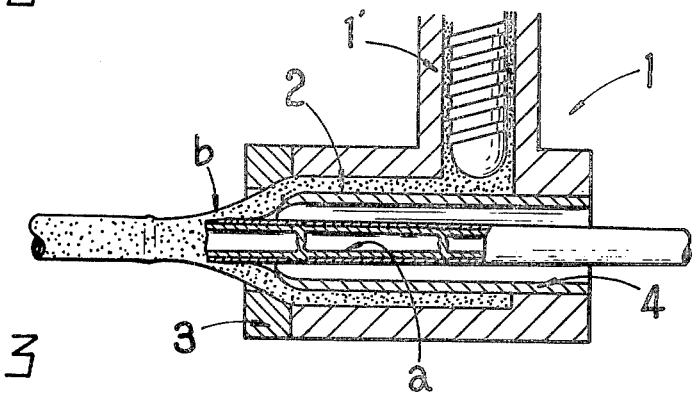
FIG 2
FIG 3
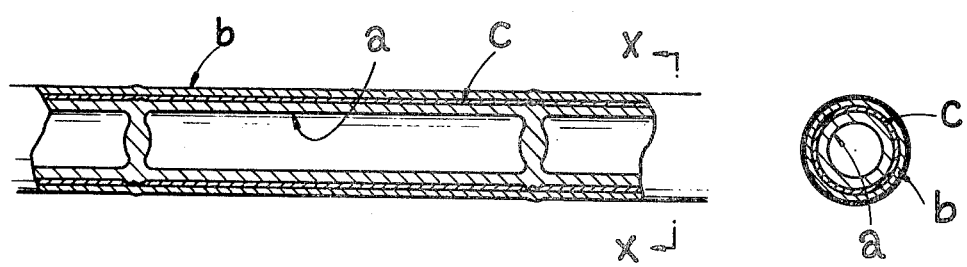
FIG 4
FIG 5
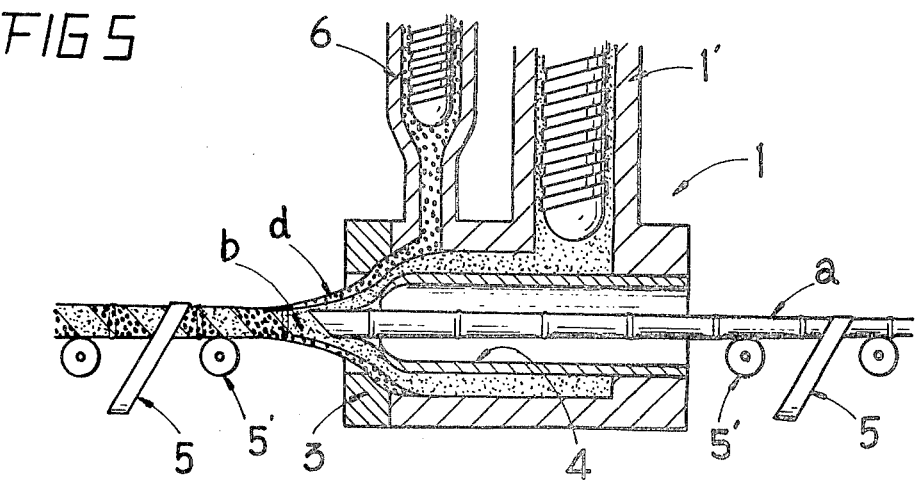

SURFACE COATING DEVICE OF BAMBOOS

This invention relates to a surface coating device of bamboos or tree branches with their surface having knots or shaping uneven wherein the surface of these materials whose outside diameter is irregular is coated by a thin synthetic resin film.

Hitherto when such natural materials as bamboos or tree branches are used for clothes poles in an ordinary household or for agricultural or fishing stays these materials had to be guarded against causing to decay or worning-out originating in worm-eating. As a counter measure a method coating the surface of these bamboos by an adequate synthetic resin is conventionally known widely. Speaking in a concrete way an example is cited in that a vinyl tube formed cylindrical beforehand is put on a bamboo and by the use of heat-absorbing contractility of said tube resulting from the heating of the cylindrical surface by hot water or other pertinent ways said tube can be tightly stuck to the bamboo surface. In another example a bamboo is put in to a melted resin supplied successively through a pushing mechanism to be coated by the film of said melted resin while being thinned all around its surface.

The former example, however, as has been explained above, needs a good number of work processes so that it has a defect of remarkably lowering down the production efficiency. As to the latter example, a bamboo merely passes through the melted resin solution depending entirely upon the adhesiveness of resin so that to obtain a uniform coating of resin film is extremely difficult. Even if the coating in the aforesaid two examples has been done perfectly, due to the fact that a cooled and then solidified resin film still potentially retains contractility within, when the bamboos are cut to uniform their length after the coating process, the resin film shrinks on account of said contractility and the end portion of finished product is inevitably exposed. Furthermore, as a perfect contact between the bamboo and the resin film can not be achieved on account of the presence of latent contractility as aforesaid, coming-off of the resin film from the finished product is apt to occur thus the coating effect which is the primary object is lessened.

The present invention is designed to solve all the aforesaid defects at a stroke and one of its chief objects is to offer a novel device wherein the surface of bamboo is made possible to be coated uniformly by the resin film through passing the bamboo rotating slowly at a constant speed in the melted resin that is successively fed by a pushing mechanism.

Another object is to offer a device wherein the end portion of bamboo doesn't expose to air nor the resin film comes off from inside even if said film gets cooled and then shrinks by closely contacting it directly or through applying a sticky tarry substance in-between on the surface of bamboo.

Still another object is to offer a device wherein the forming of coating film having a different surface structure is made possible through properly varying the quality, color & etc. of the feeding resin by providing a plural number of pushing mechanism of melted resin on the body of coating device.

A further object is to offer a device wherein the operational efficiency can be greatly elevated by automatically conducting the coating of bamboo successively.

A still further object is to offer, if so found necessary, a bamboo to be coated to enable it from getting decay or worm-eaten through applying a tarry substance having antisepsis and adhesiveness between the bamboo and the resin film.

The primary and other pertinent objects and the characteristics of this invention enumerated above in a concrete way are undoubtedly clear by the explanation described hereunder relating to this invention.

FIG. 1 is a cross-sectional view of the central portion of an embodiment applied with the device of this invention, FIG. 2 shows a cross-sectional view of the central portion of the device where, after a preliminary application of tarry substance, a resin film is formed on the surface of bamboo, FIG. 3 indicates a cross-sectional view of the central portion of bamboo coated by a resin film through applying a tarry substance, FIG. 4 describes a cross-sectional view of line x—x in FIG. 3 while FIG. 5 shows a cross-sectional view of the central portion of the device of this invention relating to another embodiment wherein a plural number of push cylinders are provided.

Description is made hereunder on the embodiments of this invention with reference to the accompanying drawings.

As shown in FIG. 1, the device (1) consists of a push cylinder (1'), a melted resin chamber (2) communicating a die (3) with one side, a nozzle (4) inserted and affixed on the inside of said chamber (2) coaxially and rotating members consisting of belts (5) or rollers (5') that move forward a bamboo (a) at a fixed speed while giving a constant rotation at front and back of the body of the device (1).

The opening (4') at the end of the nozzle (4) has a bore freely permitting the bamboo (a) having an irregular outside diameter to pass through.

A bamboo or a tree branch is inserted in to the chamber (2) at a given speed slowly rotating by means of rotating members (5) (5') through the nozzle (4) of the coating device body (1) made up as aforementioned hence the melted resin successively fed to the chamber (2) through said push cylinder (1') is made to coat the surface of bamboo (a).

Namely, the bamboo (a) inserted in to the chamber (2) moves to the rotating members (5) (5') lying ahead from the die (3) in a state of its end tip being coated by resin and under this state the bamboo (a) moves forward in which the amount of melted resin that is fed to the chamber (2) from the push cylinder (1') varies according to the diameter of the bamboo (a) and its forwarding speed but represents an amount sufficient enough to keep the resin film (b) that has been spread as thin as possible unbreakable thus the resin constantly extends forward to enable forming a resin film (b) having a standard thickness.

At the same time said bamboo (a) is given a slight rotation then said resin film is pulled at a fixed angle against the direction of axis of bamboo (a) and is coated on the surface of said bamboo (a) likely in a state of being wound up. Accordingly said resin film is assuredly stuck to the surface of said bamboo (a) in a uniform thickness exactly according to the unevenness of the bamboo surface without allowing the presence of air between the bamboo surface and the resin film.

In addition in order to further enhance the effects against corrosion and damage by worms as shown in FIG. 2, the surface of bamboo (a) is applied with a tarry substance (c) at first then coated by the resin film after inserting it into the chamber (2) having said structure thus helped by all the characteristics of anti-corrosion, insect-prevention and adhesiveness which the tarry substance (c) natively owns, presence of air between the bamboo (a) and the resin film can perfectly be evaded even if a rotation is not specifically given. Accordingly the corrosion of bamboo and the peeling-off of resin film resulting from the presence of air which have hitherto been experienced never occur thus the durability is remarkably improved.

FIG. 5 represents another embodiment wherein further one more cylinder (6) is provided between the push cylinder (1') of the device of the present invention and the die (3). In this case the lower end of the push cylinder (6) is open to the resin chamber (2) for coating purpose so that in addition to the operational effect as described above the strengthening of resin film is made possible through properly varying the quality of resin (d) that is fed to the respective cylinders (1') (6) and by changing the color of melted resin fed from the cylinder (6), coloring of surface can optionally be changed thus it possesses excellent effects.

All the aforesaid embodiments describe the bamboo (a) pass rotating through the chamber (2) respectively but there are instances where a similar coating effect can be attained by the spreading nature of the coating resin that is put in use. In order to attain an anti-corrosion, insect-prevention stay after applying beforehand a tarry substance on the surface of bamboo, there is a way of applying same either by a brush or a spray gun on the surface of bamboo but it is also possible to discharge a tarry substance having a constant viscosity from the end tip of space created by the remodeling of the nozzle of push cylinder of said structure to a double-tube system.

Description has been made as to the fitting embodiments of surface coating device of bamboos in accordance with the present invention as above but any alteration excepting those aforementioned is also possible so long as it doesn't cross the scope of the spirit and patent claims to be described later on the present invention.

I claim:

1. A device for the coating of bamboos with synthetic resin comprising a die, a synthetic resin chamber communicating with said die, a push mechanism for said synthetic resin, a nozzle tube having an opening wide enough for passage therethrough of bamboo whose outside diameter varies constantly due to knots, centrally located and affixed within said chamber, said tube having a downwardly curved end portion forming an outlet located and within the opening of said die over which end portion say synthetic resin flows onto said bamboo without filling said die opening, a feeding mechanism positioned in front of said device and a feeding mechanism positioned in back of said device, each of said mechanisms comprising a belt and roller combination for moving the bamboo at a fixed speed while giving it a constant rotation.

2. A surface coating device of bamboos described in claim 1 characterizing in setting up another push mechanism between said push mechanism and die to enable supplying resin different in quality or color.

* * * * *